July 25, 1967         M. W. BLOOM ETAL         3,332,411
LUBRICATION SYSTEM FOR CHAIN SAWS
Filed Sept. 7, 1965                        2 Sheets-Sheet 1

INVENTORS
Merle W. Bloom
Richard A. Huston
Richard W. Condon
Nathan N. Kraus
Frank H. Marks  Attys INVENTORS
Merle W. Bloom
Richard A. Huston
Richard W. Condon
Nathan N. Kravs
Frank H. Marks  Attys

United States Patent Office

3,332,411
Patented July 25, 1967

3,332,411
LUBRICATION SYSTEM FOR CHAIN SAWS
Merle W. Bloom, Manteno, Ill., Richard A. Huston, Dexter, Mich., and Richard W. Condon, Park Forest, Ill., assignors of one-half to Geo. D. Roper Coporation, Kankakee, Ill., a corporation of Delaware, and one-half to Dexter Automatic Products Company, Dexter, Mich., a corporation of Michigan
Filed Sept. 7, 1965, Ser. No. 485,378
5 Claims. (Cl. 123—196)

This invention relates to a lubrication system for a power driven chain saw.

One of the objects of this invention is the provision of a lubricating system for a power driven chain saw which automatically delivers a continuous flow of lubricant to the saw, under relatively low pressure, during operation, and which includes a selectively operated manual means to provide lubricant under relatively high pressure for clearing the lubricant passages from natural clogging after repeated usage.

Another object of this invention is the provision of a lubricating system for chain saws which utilizes cylinder bleed pressure to provide the force necessary to effect flow of the lubricant from a lubricant reservoir to a point of use on the chain saw.

A further object of this invention is the provision of a lubricating system of the foregoing character which is simple in construction, effiicent in operation and economical to manufacture.

Other and further objects and advantages of this invention will become apparent from the following description which the same is considered in connection with the accompanying drawings in which, FIG. 1 is a top plan view of a lubricating system in accordance with this invention, the same being shown incorporated in a power driven chain saw, a fragmentary portion of which is illustrated in phantom;

Figure 1:
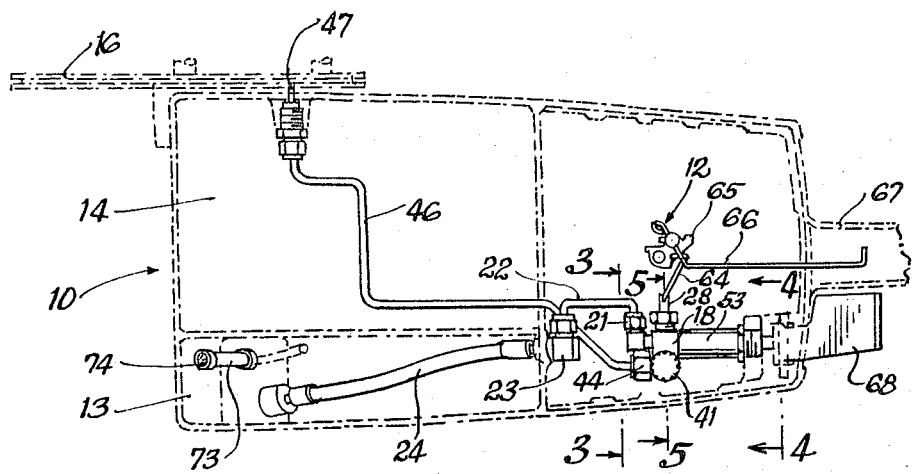

Referring to the drawings, the numeral 10 indicates generally an exemplary chain saw and for purposes of clarity only such portions of said chain saw which are necessary for an understanding of the present invention are illustrated. The chain saw includes a conventional internal combustion engine 11 which is preferably a light weight two cycle gasoline engine, a carburetor 12 connected to the engine, a top mounted compartmented tank, one compartment 13 to contain lubricating oil and the other compartment 14 to contain fuel, and a forwardly extending guide bar 16 having a saw chain trained thereover. The chain is driven through conventional sprocket and clutch means, not shown.

The lubrication system for the chain saw includes a valve and pump assembly indicated generally by the numeral 17 which may be formed of solid blocks which have been machined and joined as by brazing to form a body portion 18. Said body portion is provided with an inlet passage 19, the mouth of which communicates with a combination elbow fitting and check valve 21 connected to an inlet conduit 22 which is suitably connected to a fitting 23 mounted on the wall of the lubricant reservoir 13 in which is disposed a flexible tubular conduit 24 connected to the fitting 23. Said tubular conduit affords means for delivering lubricant from the reservoir 13 to the assembly 17.

Figure 7:
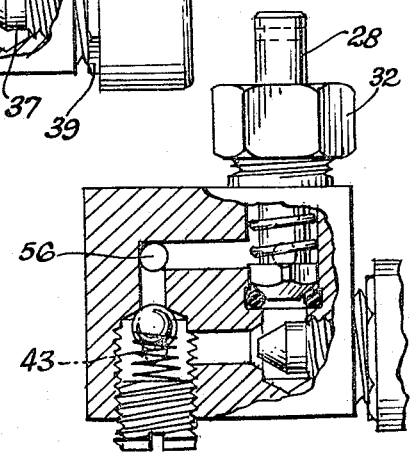

The inlet passage 19 communicates with a lubricant chamber 26 in the bottom of which is disposed an O-ring 27 affording a valve seat arranged to co-operate with a plug valve 28, the stem of which is coaxially disposed in said chamber and is circumposed by a coil spring 29 which normally urges the plug valve to closed position, as illustrated in FIG. 7. The stem of plug valve 28 is maintained in sealing engagement with the lubricant chamber by an O-ring 31 which is retained in position by a packing nut 32. The plug valve 28 is provided with an enlarged fluted head portion 30 adjacent to the operating end thereof, whereby lubricant entering into the lubricant chamber 26 from the inlet port 19 may pass into extension 33 of the lubricant chamber down stream of the valve seat 27. The lubricant chamber 26 is provided with an axial extension 33 which intersects a transverse passage 34 and at the juncture of said extension and passage there is provided a valve seat 36 which co-operates with a metering valve 37, the stem of which projects through the body portion 18 and is retained in sealing engagement therewith by an O-ring seal 38 and a packing nut 39. The stem of valve 37 is suitably threaded for a portion of its length and said threaded portion is received in a correspondingly threaded portion in the bore of the body 18. The outer end of the stem of valve 37 carries a bonnet serving as an operating knob 41 by which the metering valve 37 may be rotated to adjust the metering orifice or completely close off the same. The transverse passage 34 communicates with a lubricant chamber 40 provided with a discharge port 43 and a suitable fitting 44 connects said port to the lubricant feed line 46. The discharge end of the feed line 46 is connected into a suitable aperture 47 in the guide bar 16 so that lubricant is delivered to the peripheral groove of the guide bar to lubricate the path of travel of the saw chain.

A substantially L-shaped passage 42 affords communication between the lubricant chambers 26 and 40. The chamber 40 is provided with a valve seat 48 arranged to co-operate with a ball check valve 49 which is biased to closed position by a spring 51, the valve seat being disposed upstream of the outlet port 43. The lubricant chamber 40 is internally threaded to receive a closure plug 52 against which end of the spring 51 abuts.

The body portion 18 is provided with an integral cylindrical extension 53 having an axial bore 54 which communicates through a passage 56 with the L-shaped passage 42 at a point upstream of the valve seat 48. A piston 57 is received in said bore, the piston being circumferentially grooved to accommodate an annular O-ring seal 58. The piston 57 is integrally formed with a piston rod 59 which passes through a retainer fitting 61 threaded into the bore, said fitting serving to journal the piston rod during reciprocal movement of the piston in the bore. The end of the piston 57 is counter-bored to receive one end of a spring 62, the other end 63 of which abuts against the shoulder at the end of the bore. The spring normally biases the piston in an outwardly direction.

The stem of plug valve 28 is pierced at its outer end to receive one end of a link wire 64, the other end of which is connected to the throttle control lever 65 of the carburetor 12. A throttle control wire 66 has one end connected to said lever and the other end connected to a trigger, not shown, which is pivotally mounted in the handle 67 of the frame assembly. As viewed in FIG. 1, manipulation of the trigger effects rocking of the throttle control lever 65 in a counter-clockwise direction so that when the trigger is actuated to accelerate the engine whereby the speed of travel of the chain is increased, the plug valve 28 will be moved away from its seat 27 to permit the flow of lubricant from the inlet port 19 into the chamber 33 downstream of the valve seat 27. The size of the valve opening is proportioned to the speed of travel of the saw chain so that with the increased speed a greater flow of lubricant is effected.

Figure 2:
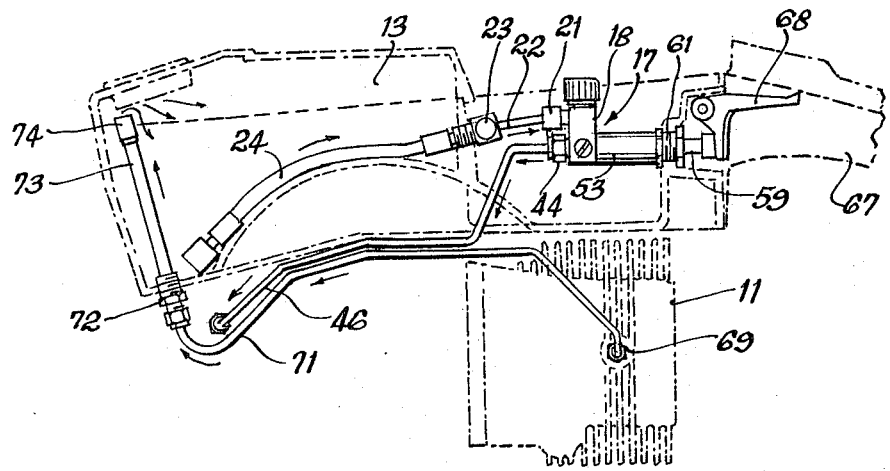
FIG. 2 is a side elevational view of the lubricating system and chain saw illustrated in FIG. 1.
Figure 9:
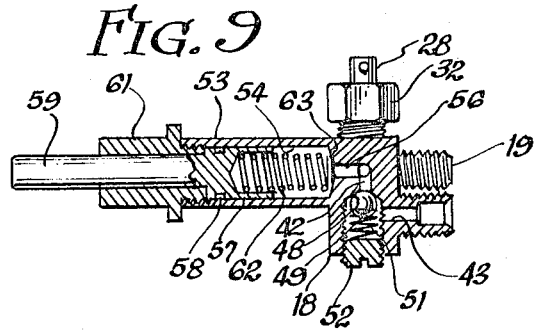
FIG. 9 is a cross-sectional view taken substantially on line 9—9 of FIG. 4.
Figure 3:
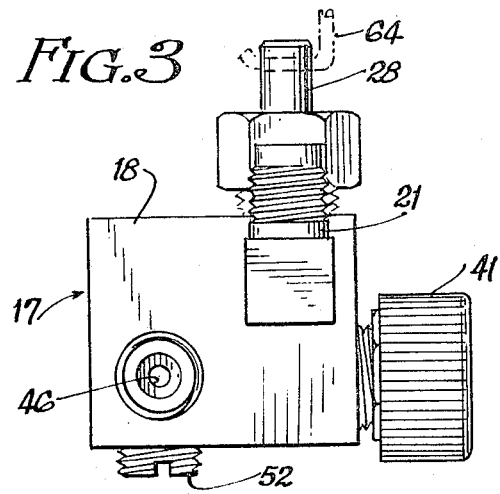
FIG. 3 is an elevational view, on an enlarged scale, taken substantially on line 3—3 of FIG. 1.
Figure 4:
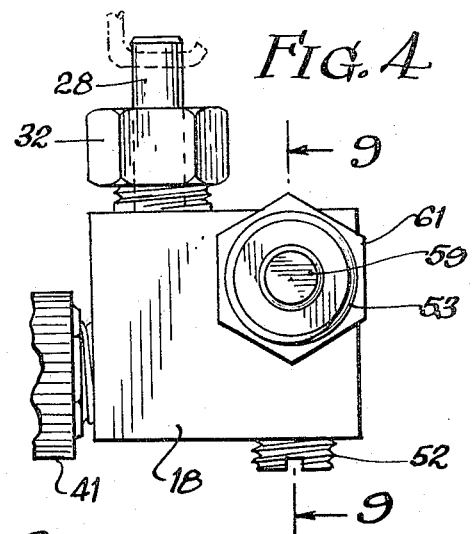
FIG. 4 is an elevational view, on an enlarged scale, taken substantially on line 4—4 of FIG. 1.

A generally L-shaped lever 68 is pivotally mounted on the frame assembly with one leg of said lever abutting against the end of the piston rod 59, and the other leg of said lever being disposed closely adjacent to the handle 67 and constituting a thumb engaging member so that rocking of the lever 68 in a clockwise direction, as viewed in FIG. 2, will effect actuation of the piston 57, as will be hereinafter explained.

A fitting 69 is threaded into a port in the wall of the engine cylinder 11 and a pressure line 71 extends from the fitting to another fitting 72 threaded into a port in the bottom of the lubricant reservoir 13. A rigid tube 73 extends upwardly from the fitting within the reservoir to a point above the maximum level of lubricant placed in the reservoir. The upper end of the tube 73 is provided with a reed type check valve 74 so that gases passing through the tube move only in the direction indicated by the arrows.

The location of the port in relation to the engine cylinder 11 is selected to obtain a pulsating bleed pressure from the cylinder of the order of 25 p.s.i. which pressure is delivered through the line 71 and tube 73 into the lubricant reservoir 13 during the operation of the engine. As a consequence, reservoir 13 is maintained under a pressure of about 20 p.s.i. which is adequate to cause lubricant to be discharged from the reservoir 13 through the lubricant pick-up tube 24 and through the valve and pump assembly 17, in a manner as will be presently described.

Figure 8:
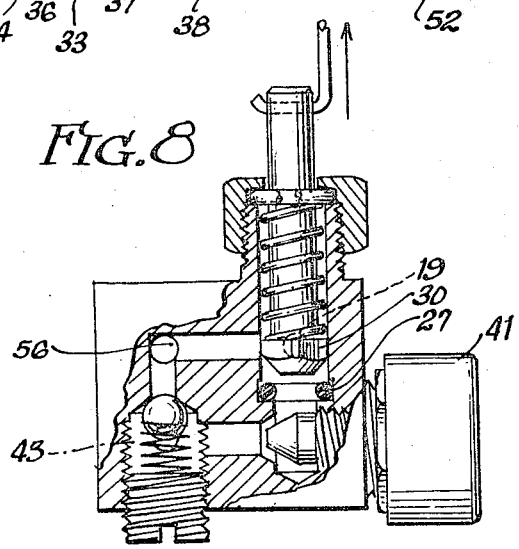

Assuming that the metering orifice has been adjusted by rotation of the knob 41 to provide a desired quantity of flow of lubricant, it will be apparent that as soon as operation of the engine is initiated, lubricant will pass through the pick-up tube 24 into the inlet passage in the assembly 17 and will fill the lubricant chamber 26 upstream of the valve seat 27, as well as the L-shaped passage 42. As the operator manipulates the throttle control lever 65, valve 28 is caused to move from the closed position illustrated in FIG. 7 to the open position illustrated in FIG. 8, or any intermediate position, so that lubricant may flow from the chamber 26 through the flutes in the head portion 30, into the chamber extension 33, through the metering orifice, through a passage 34, chamber 40, outlet port 43, and into the line 46 connected to the guide bar. As the throttle lever 65 is progressively advanced, the valve opening is correspondingly increased to permit a greater flow of lubricant to the guide bar to effect lubrication of the saw chain passing thereover at an increased linear speed. As will be seen by reference to FIG. 8, the ball check valve 49 remains in closed position during the normal flow of lubricant, as above described, so that no lubricant may flow from the passage 42 into the chamber 40. The ball 49 is biased by spring 51 which exerts a force of 40 lbs. which is substantially greater than the pressure of the lubricant within passage 42.

Figure 5:
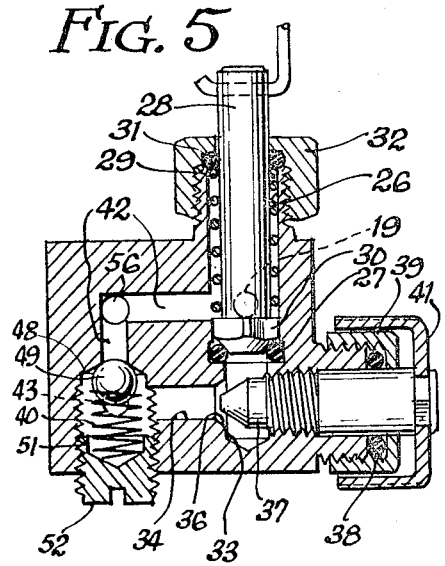
FIG. 5 is a cross-sectional view, on an enlarged scale, taken substantially on line 5—5 of FIG. 1.
Figure 6:
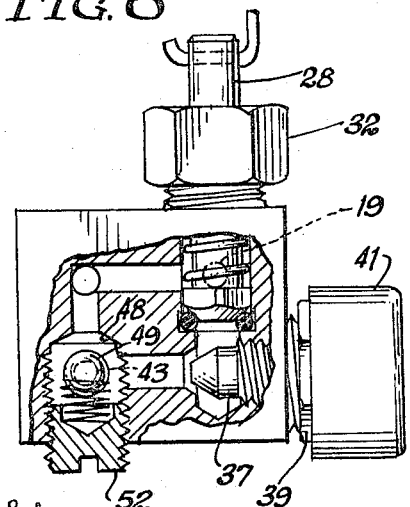
FIGS. 6, 7 and 8 are elevational views, similar to FIG. 3, but partly in cross-section, and illustrating the parts in different positions under different conditions of operation.

After the saw has been in operation for a period of time, sawdust and other foreign matter may accumulate in the peripheral groove of the guide bar 16 blocking the discharge end of the feed line 46 and impairing the flow of lubricant to the guide bar 16. To correct this condition the operator need only to release the throttle control to effect closing of the plug valve 28, as in FIG. 5 and then depress the lever 68 to cause the piston 57 to move inwardly within the bore 54, thereby unseating the check valve 43 due to pressure on the same, as shown in FIG. 6, so that lubricant within the bore 54 is caused to flow through the passage 42 into the lubricant chamber 40 and through the outlet port 43 into the lubricant feed line 46 to expel any blocking matter to permit the system to function again under normal cylinder bleed pressure conditions. The pressure developed by the piston 57 when the same is actuated is of the order of 100 p.s.i. which generally is adequate to dislodge any blocking material in the lubricating system. It will be apparent that when the piston 57 is actuated, check valve 21 is rendered effective to close off the intake conduit 24.

When the lever 68 is released, piston 57 returns to retracted position where it remains until the lever is again manipulated.

It will be apparent from the foregoing that the lubrication system of our invention combines both automatic and manual features which serve to maintain a supply of lubricant to the chain for normal operating conditions while permitting a build up of pressure adequate to dislodge foreign material impairing the flow of lubricant.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. In a portable chain saw of the type powered by an internal combustion engine having a piston and cylinder assembly and engine control means and having an endless saw chain trained about a guide bar and means operatively connecting said engine to said chain for driving the same, a lubrication system for lubricating the saw chain and guide bar, comprising
    (a) a lubricant reservoir,
    (b) a pressurizing line communicating between said reservoir and the engine cylinder to place the lubricant in the reservoir under greater than atmospheric pressure when the engine is operating,
    (c) a valve and pump assembly having a body having separate first and second chambers,
    (d) a valve in said first chamber selectively controlling the flow of lubricant therethrough,
    (e) said valve being operatively connected to and responsive to positional changes of said engine control means,
    (f) said body having a first passage communicating at its upstream end with said first chamber downstream of said valve and communicating at its downstream end with said second chamber,
    (g) said body having a second passage communicating at its upstream end with said first chamber upstream of said valve and commnuicating at its downstream end with said second chamber,
    (h) a check valve disposed at the downstream end of said second passage and normally biased to closed position,
    (i) a metering valve in said first chamber downstream of said first mentioned valve to control the flow of lubricant through said first passage,
    (j) said body having an inlet port communicating with said first chamber and having an outlet port communicating with said second chamber,
    (k) a conduit between said lubricant chamber and said inlet port,
    (i) a lubricant feed line between said outlet port and said guide bar, and
    (m) a piston reciprocable within a cylinder communicating with said second passage upstream of said check valve,
    (n) said piston being selectively operable upon each working stroke to force lubricant through said check valve and through said lubricant feed line to clear the same of any blocking obstruction.

2. In a portable chain saw of the type powered by an internal combustion engine having a piston and cylinder assembly and engine control means and having an endless saw chain trained about a guide bar and means operatively connecting said engine to said chain for driving the same, a lubrication system for lubricating the saw chain and guide bar comprising (a) a lubricant reservoir,
(b) a valve and pump assembly having a body having separate first and second chambers,
(c) a pressurizing line communicating between said lubricant reservoir and said engine cylinder,
(d) said lubricant reservoir being subject to cylinder bleed pressure generated by said engine to provide a pressurized flow of lubricant into said first chamber,
(e) a first check valve in said conduit upstream of said first chamber,
(f) a valve means in said first chamber selectively controlling the flow of lubricant therethrough,
(g) said valve means being operatively connected to and responsive to positional changes of said engine control means,
(h) said body having a first passage communicating at its upstream end with said first chamber downstream of said valve means and communicating at its downstream end with said second chamber,
(i) said body having a second passage communicating at its upstream end with said first chamber upstream of said valve means and communicating at its downstream end with said second chamber,
(j) a second check valve disposed at the downstream end of said second passage and normally biased to closed position,
(k) a metering valve in said first chamber downstream of said valve means to control the flow of lubricant through said first passage,
(l) said body having an inlet port communicaing with said first chamber and an outlet port communicating with said second chamber,
(m) a conduit between said lubricant chamber and said inlet port,
(n) a lubricant feed line between said outlet port and said guide bar, and
(o) a piston reciprocable within a cylinder communicating with said second passage upstream of said second check valve,
(p) said piston being selectively operable upon each working stroke to force lubricant through said second check valve and through said lubricant feed line to clear the same of any blocking obstruction.

3. The invention as defined in claim 2 in which the downstream end of said pressurizing line is disposed above the oil level of said lubricant reservoir and is provided with a reed type check valve.

4. In a lubrication system for a portable chain saw,
(a) a valve and pump assembly having a body having separate first and second chambers,
(b) means delivering a flow of lubricant to said first chamber,
(c) a valve in said first chamber selectively controlling the flow of lubricant therethrough,
(d) said body having a first passage communicating at its upstream end with said first chamber downstream of said valve and communicating at its downstream end with said second chamber,
(e) said body having a second passage communicating at its upstream end with said first chamber upstream of said valve and communicating at its downstream end with said second chamber,
(f) a check valve disposed at the downstream end of said second passage and normally biased to close position,
(g) a metering orifice in said first chamber downstream of said first mentioned valve to control the flow of lubricant through said first passage,
(h) a lubricant feed line connected between said second chamber and a point of use,
(i) a piston reciprocable within a cylinder communicating with said second passage upstream of said check valve,
(j) said piston being selectively operable upon each working stroke to force lubricant through said check valve and through said lubricant feed line to clear the same of any blocking obstruction.

5. In a portable chain saw of the type powered by an internal combustion engine having a piston and cylinder assembly and engine control means and having an endless chain trained about a guide bar and means operatively connecting said engine to said chain for driving the same, a lubricating system for lubricating the saw chain and guide bar, comprising (a) a lubricant reservoir,
(b) a pressurizing line communicating between said reservoir and the engine cylinder to place the lubricant in the reservoir under greater than atmospheric pressure when the engine is operating,
(c) a valve and pump assembly having a body having separate first and second chambers,
(d) a valve in said first chamber selectively controlling the flow of lubricant therethrough,
(e) said valve being operatively connected to and responsive to positional changes of said engine control means,
(f) said body having a first passage communicating at its upstream end with said first chamber downstream of said valve and communicating at its downstream end with said second chamber,
(g) said body having a second passage communicating at its upstream end with said first chamber upstream of said valve and communicating at its downstream end with said second chamber,
(h) a check valve disposed at the downstream end of said second passage and normally biased to closed position,
(i) said body having an inlet port communicating with said first chamber and having an outlet port communicating with said second chamber,
(j) a conduit between said lubricant chamber and said inlet port,
(k) a lubricant feed line between said outlet port and said guide bar, and
(l) a piston reciprocable within a cylinder communicating with said second passage upstream of said check valve,
(m) said piston being selectively operable upon each working stroke to force lubricant through said check valve and through said lubricant feed line to clear the same of any blocking obstruction.

References Cited
UNITED STATES PATENTS

| | | | |
|---|---|---|---|
| 2,498,407 | 2/1950 | Fine | 137—565 X |
| 2,944,538 | 7/1960 | Conway | 143—32.1 X |
| 3,010,538 | 11/1961 | Strunk | 184—15 |

LAVERNE D. GEIGER, *Primary Examiner.*

H. BELL, *Assistant Examiner.*